(12) United States Patent
Seroussi

(10) Patent No.: US 7,386,148 B2
(45) Date of Patent: Jun. 10, 2008

(54) METHOD AND SYSTEM FOR END OF RUN WATERMARKING

(75) Inventor: Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 10/903,102

(22) Filed: Jul. 30, 2004

(65) Prior Publication Data

US 2006/0023880 A1 Feb. 2, 2006

(51) Int. Cl.
*G06K 9/00* (2006.01)
(52) U.S. Cl. ...................................... 382/100
(58) Field of Classification Search ................ 382/100, 382/246; 380/255; 341/50
See application file for complete search history.

(56) References Cited

U.S. PATENT DOCUMENTS

2002/0076115 A1* 6/2002 Leeder et al. ................ 382/250
2003/0048956 A1* 3/2003 Mitchell et al. ............. 382/250

OTHER PUBLICATIONS

M. Weinberger, G. Seroussi, G. Sapiro, "The LOCO-I Lossless Image Compression Algorithm: Principles and Standardization into JPEG-LS", Hewlett-Packard Laboratories Technical Report No. HPL-98-193R1, Nov. 1998, revised Oct. 1999. IEEE Trans. Image Processing, vol. 9, Aug. 2000, pp. 1309-1324.

M. Weinberger, G. Seroussi, G. Sapiro, "LOCO-I: A Low Complexity, Context-Based, Lossless Image Compression Algorithm," Proc. IEEE Data Compression Conference, Snowbird, Utah, Mar.-Apr. 1996.

* cited by examiner

*Primary Examiner*—Matthew C. Bella
*Assistant Examiner*—Claire Wang

(57) ABSTRACT

Embedding a watermark includes receiving a datastream of repeated values, determining if an end of run mode permits embedding a first or second binary value, transmitting a shortened version of the datastream when the next bit is a first binary value, appending to the datastream a redundant codeword indicating when the next bit is a first binary value and transmitting an unshortened version of the repeated data values to indicate the next bit is a second binary value and appending a conventional codeword from the codespace indicating the end of run mode and second binary value. Extracting a watermark bit-sequence includes determining if an end of run mode could have embedded either binary value, indicating a first binary value when the end of run mode uses a redundant codeword from the codespace and indicating a second binary value when the end of run mode uses a conventional codeword.

41 Claims, 10 Drawing Sheets

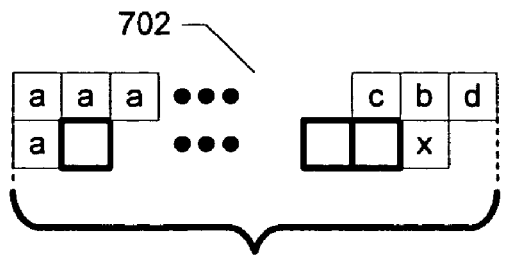
704 {
1) $\hat{x}_{i+1} \square b$, in EOR mode *and*
2) $\varepsilon_{i+1} = x - \hat{x}_{i+1} = x - b$
3) *Since* $x \neq a \therefore \varepsilon_{i+1} \neq a - b$
Redundant codeword in EOR mode:
$$\varepsilon_{i+1} = a - b$$
706
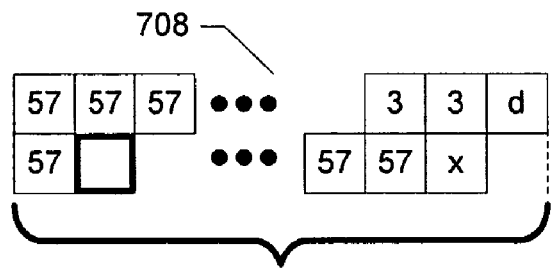
710 {
1) $\hat{x}_{i+1} \square 3$, if EOR mode *and*
2) $\varepsilon_{i+1} = x - \hat{x}_{i+1} = x - 3$
3) *Since* $x \neq 57 \therefore \varepsilon_{i+1} \neq 54$ in EOR mode
Redundant codeword in EOR mode:
$$\varepsilon_{i+1} = 54$$
712
*FIG. 7*

```
if ( (k > 0) and (c!=a ) {
    set w = next watermark bit
    if ( w == first binary value ) {/*watermark value is 1st binary value*/
        send run length = k-1
        encode "a" using EOR(b!=a) sub-mode (using redundant codeword)
        set next symbol = x
    }
    else {/* watermark value is 2nd binary value */
        send run length = k
        encode x using EOR(b==a)or EOR(b!=a) sub-mode as appropriate
        set next symbol = y
    }
}
else { /* no watermark value is embedded in the EOR */
    send run length = k
    encode x using EOR(b==a)or EOR(b!=a) sub-mode as appropriate
    set next symbol = y
}
Continue_encoding()         802
```

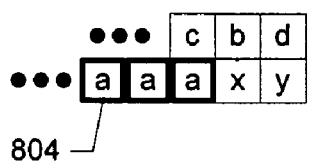
804

```
if ( b == a )
    decompress next codeword into x using EOR(b==a) sub-mode
else {
    decompress next codeword into x using EOR(b!=a) sub-mode
    if ( x == a ) /*redundant codeword used */
        set next watermark bit = first binary value
    else
        if ( ( k > 0 ) and (c != a) )
            set next watermark bit = second binary value
}
Continue_decoding ()
            806
```

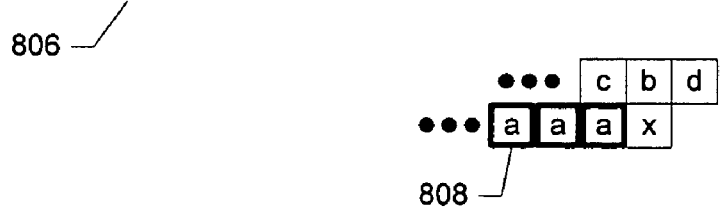
808

FIG. 8

METHOD AND SYSTEM FOR END OF RUN WATERMARKING

BACKGROUND OF THE INVENTION

The present invention relates to data compression and watermarking.

In computing, a watermark is a bit-sequence that relates or is associated with other digital content. Unlike printed watermarks consisting of specially printed images or embossed papers, digital watermarks may also correspond to general number sequences, checksums or any other type of digitally transmitted data. Resilient digital watermarks can be used to identify the owner of certain content. These watermarks continue to identify a particular owner despite attempts by a third party to remove or alter the content without authorization. In contrast, fragile watermarks become unreadable or corrupt when digital content and the underlying watermark are altered. These fragile watermarks ensure the authenticity of certain documents and prevent data tampering from going unnoticed. No doubt, many other uses of digital watermarks exist and will be created in the future.

In most cases, the watermark is transmitted along with an input stream of digital data. If the input stream is not compressed, the watermark can be added to the digital data input stream increasing the overall amount of data being transmitted. Often however, it is desirable to compress the digital data stream thereby increasing the effective network bandwidth and decreasing storage requirements. One solution is to device a compression routine that both compresses the input stream using a compression routine and also embeds the watermark bit-sequence.

Adding a watermark to compressed digital data is not particularly difficult using lossy compression techniques. These lossy compression techniques selectively eliminate certain bits and replace them with the watermark values, or otherwise alter the encoded data to introduce the watermark information. Data loss in the original data stream is not only caused by the lossy compression/decompression operation but exacerbated by the addition of the watermark. In some cases, the loss introduced by the addition of a watermark is acceptable.

Unfortunately, adding a watermark and loss to an input data stream compressed losslessly defeats the purpose of lossless compression. Popular lossless compression methods such as JPEG-LS and its variants do not provide space for watermark insertion. Resolving this problem is even more challenging if an inserted watermark cannot reduce compression performance or increase the size of the compressed stream. Even if the watermarks could be introduced without introducing loss or compression performance deterioration, it would be difficult to do so and ensure that the enhanced decompressors are backward compatible with existing coders and compressed streams. Lack of backward compatibility is one or the more considerable impediments to enhancing lossless compression operations to accept watermarks.

BRIEF DESCRIPTION OF THE DRAWINGS

FIG. 7 is a diagram using the template in JPEG-LS and illustrating its role in embedding watermark values in accordance with one implementation of the present invention;

FIG. 8 provides a pair of pseudocode segments illustrating a watermark encoder pseudocode and a watermark decoder pseudocode implemented in accordance with the present invention and using JPEG-LS compression.

Like reference numbers and designations in the various drawings indicate like elements.

SUMMARY OF THE INVENTION

Figure 1:
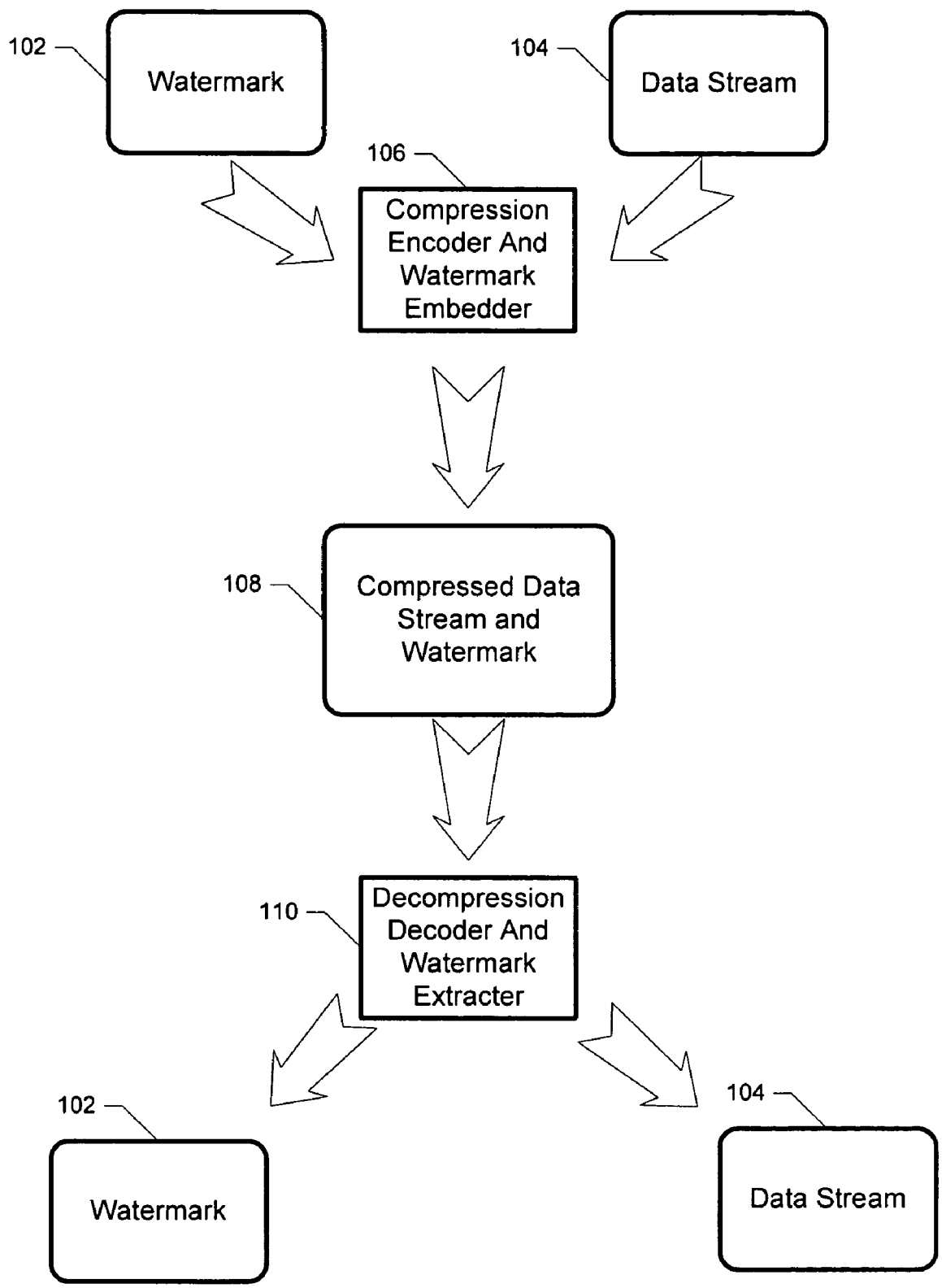
FIG. 1 is a diagram of a system for embedding a watermark in accordance with one implementation of the present invention.

One aspect of the present invention features a method of embedding a watermark bit-sequence in a compressed datastream. Embedding the watermark includes receiving a datastream of repeated data values for compression using a run mode encoding, determining if an end of run mode entered after the run mode encoding permits embedding either a first binary value or a second binary value from the watermark bit-sequence, transmitting a run length value to the compressed datastream for the run mode encoding that represents a shortened version of the datastream of repeated data values when the next bit in the watermark bit-sequence is a first binary value, appending to the compressed datastream a redundant codeword from a codespace in the end of run mode when the next bit in the watermark bit-sequence is a first binary value and transmitting a run length value to the compressed datastream for the run mode encoding that represents an unshortened version of the datastream of repeated data values and indicates the next bit in the watermark bit-sequence is a second binary value and appending to the compressed datastream a conventional codeword from the codespace in the end of run mode when the next bit in the watermark bit-sequence is a second binary value.

Another aspect of the present invention describes a method of extracting a watermark bit-sequence from a data stream. The watermark extraction operation includes determining if an end of run mode entered after a run mode encoding of repeated data values was capable of being used to embed either a first binary value or a second binary value from a watermark bit-sequence, indicating a first binary value corresponding to the watermark in response to the determination and when the end of run mode uses a redundant codeword from the codespace and indicating a second binary value corresponding to the watermark in response to the determination and when the end of run mode uses a conventional codeword from the codespace.

DETAILED DESCRIPTION

Aspects of the present invention are advantageous in at least one or more of the following ways. A watermark can be introduced into an image without distorting the original image. Instead, the bit-sequence corresponding to the watermark is carefully embedded in the compressed image by taking advantage of a vestigial redundant codeword at the end of a run mode compression operation.

Further, the present invention does not interfere with a standard decompressor's ability to extract an image losslessly even though the image has a watermark bit-sequence embedded throughout the image. Instead of attempting to extract the watermark, the standard decompressor simply obtains the image without the watermark bit-sequence. In contrast, an enhanced decompressor designed in accordance with the present invention not only extracts the compressed part of the image but also obtains the bit-sequence of the watermark. To restrict access, the watermark can be embedded according to a binary secret key that identifies the end of run positions that either have or don't have the embedded watermark bits. Keying allows watermarks to be hidden in images for digital rights management and authentication purposes.

One implementation of the present invention works with the JPEG-LS compression standard as it combines both a run mode compression and variable length codeword compression operation. In particular, implementations of the present invention use a redundant codeword to indicate an end of run (EOR) mode and embed a watermark binary value in JPEG-LS. JPEG-LS is a compression standard described in ISO 14495-1/ITU Rec. T.87 and also in an article entitled, "The LOCO-I Lossless Image Compression Algorithm: Principles and Standarization into JPEG-LS", IEEE Transactions on Image Processing, Vol. 9, No. 8, August 2000, pp. 1309-1324. In general, however, principles and teachings of the present invention could also be applied to the class of compression operations that use run mode compression either alone or in combination with other types of compression. By requiring only one redundant codeword in the codespace used in an EOR mode, a number of conventional compression operations could be modified in accordance with implementations of the present invention. These various compression operations can be modified to include a watermark bit-sequence losslessly and with minimal additional overhead and impact on the overall compression scheme.

FIG. 1 is a block diagram overview of a system for embedding a watermark in accordance with one implementation of the present invention. System 100 includes a watermark 102 having a corresponding bit-sequence, a data stream 104 also having a bit-sequence, a compression encoder and watermark embedder 106 (hereinafter compression encoder 106), a compressed data stream and watermark 108 and a decompression decoder and watermark extractor 110 (hereinafter decompression decoder 110).

Watermark 102 represents a bit-sequence containing additional information to be sent along with data stream 104. This bit-sequence in watermark 102 is not limited to carrying visual information or pictures but instead includes any information susceptible to digital encoding. In general, the watermark can be any type of digital data and is not limited to a specific data format or type of content. For example, watermark 102 can be a numeric sequence used for coding, a sequence of check digits for the input data, audio information, video-streaming data, digital images, metadata or any other information to be used in conjunction with the data stream 104.

Data stream 104 represents a bit-sequence being compressed in real-time. Once again, the bit-sequence in data stream 104 includes any information susceptible to digital encoding including, but not limited to, those examples previously described. In one implementation, data stream 104 is a digital image and compression encoder 106 is compatible with JPEG-LS or other compression operations considered to be in a similar class as JPEG-LS. Implementations of the present invention can be readily applied to JPEG-LS for the lossless embedding of watermarks in a compressed datastream.

Accordingly, in one implementation of the present invention data stream 104 is compressed using compression encoder 106 in accordance with JPEG-LS compression and its variants. The image is compressed using run mode compression, end of run (EOR) mode compression and regular mode compression using variable length codewords. During compression, implementations of the present invention dynamically inspect the codespace to exploit and use a vestigial redundant codeword value. This redundant codeword is used by compression encoder 106 to then embed the watermark bit-sequence at the end of run. Implementations of the present invention opportunistically inserts bits from watermark 102 at the end of a run in conjunction with the aforementioned redundant codeword. Further details on the watermarking operation are described later herein.

Compressed data stream and watermark 108 contains a compressed version of data stream 104 and watermark 102 embedded in accordance with implementations of the present invention. As previously described, the data stream can be compressed losslessly using JPEG-LS compression and its variants. Watermark 102 is embedded losslessly as it uses a redundant codeword in the codespace and does not impact the original content being compressed.

Storage devices (i.e., CD-ROM, DVD) and networks can be used to transmit compressed data stream and watermark 102 as required by the particular application or need. As will be described in further detail later herein, the embedded watermark is generally considered fragile and can also be used to readily detect if the compressed data stream has been altered. Many other applications of the present invention are also contemplated in the areas of content storage and/or transport.

Decompression decoder 110 implemented in accordance with the present invention both extracts embedded watermark 102 and decompresses data stream 104. If data stream 104 is compressed without watermark 102 then decompression decoder 110 "extracts" an all-zero watermark. Likewise, a conventional decompression decoder not equipped to process watermarks is able to extract data stream 104 without complication.

More importantly, the unenhanced or conventional decompression decoder can also process compressed data stream and watermark 108 embedded with an actual watermark using the redundant codeword from the codespace. Instead of rejecting the stream as invalid or stopping, the conventional decompressor encounters the redundant codeword and restores the original repetition count or run from the most recent run mode compression. For example, a conventional JPEG-LS decompressor responds by replacing a redundant codeword placed in the data stream by implementations of the present invention with the original run length value thus restoring the shortened run length to the run length or repetition count. This ensures that implementations of the present invention are backward compatible with conventional decompression decoders.

Figure 2:
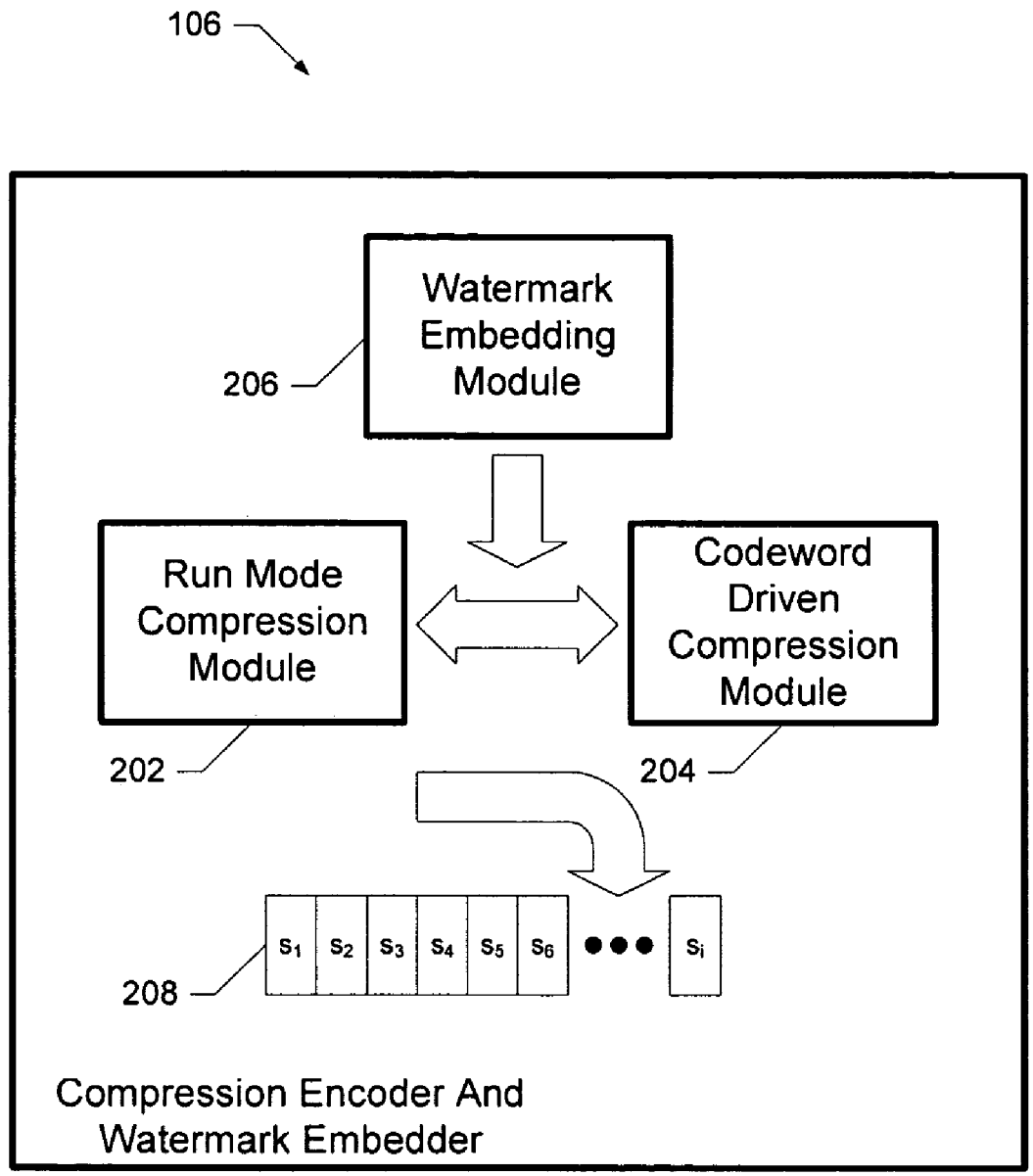
FIG. 2 is a schematic illustration of the watermark embedding performed in accordance with implementations of the present invention.

FIG. 2 is a schematic illustration of the watermark embedding performed in accordance with the present invention. This schematic illustration includes a run mode compression module 202, a codeword driven compression module 204, a watermark embedding module 206 and secret data key 208. Run mode compression module 202 and codeword driven compression module 204 are used by a class of compression operations that compress images and other similar data streams in two modalities: a run mode compression and a codeword driven compression mode. The codeword driven compression mode further includes an end of run (EOR) sub-mode for transitions between the run mode compression and codeword compression. JPEG-LS is one compression operation that combines use of a run mode and a codeword or regular mode for compression. In JPEG-LS, the codeword sent in EOR mode after the run is compressed differently from the codewords compressed in the regular mode for compression.

As previously described, implementations of the present invention exploit a characteristic occurring at the end of run when the compression operation is switching between run mode compression module 202 and codeword driven compression module 204. For example, in JPEG-LS the end of run occurs when a run of values is interrupted by either an end-of-line or, more importantly, a value not in the run. Most notably, this latter type of event causes the compression to switch from operating under run mode compression module 202 to codeword driven compression module 204. Generally, the compression operation begins sending variable length codewords to compress data subsequent to the run and switch back to run mode compression when another run of values are encountered in the image. In the case of JPEG-LS and its variants, a run mode compression is entered when a causal template detects a "flat context" in the region of the image as described in further detail later herein.

Instead of ending each run the same, watermark embedding module 206 selectively modifies the end of run processing depending on the next binary value in the watermark to be embedded. Embedding either a first binary value (e.g., binary value "0") or a second binary value (e.g., binary value "1") depends on the next bit-value in the sequence of bits in the watermark and, in the case of JPEG-LS, a dynamic determination of values in the datastream. In one implementation, a first binary value is embedded by shortening the run by one codeword (i.e., decreasing the repetition count for the codeword) and inserting a redundant but valid codeword in the EOR submode.

The second binary value is embedded without shortening the run by even one symbol. On the contrary, a second binary value from the watermark is embedded by not shortening the run and instead using a conventional codeword in the EOR submode. The conventional codeword is a normal codeword selected from the codespace in accordance with the conventional compression or decompression operations. Essentially, the second binary value of the watermark is embedded by not inserting the redundant codeword in the EOR mode position. In JPEG-LS, an additional threshold determination is also made ensuring that EOR mode is capable of representing either the first binary value (e.g., binary value "0") or the second binary value (e.g., binary value "1") before either can be embedded using implementations of the present invention. As will be described in further detail below, conditions in the JPEG-LS coding scheme may occasionally not permit embedding either a first or second binary value through the EOR mode. Consequently, not every end of run occurrence used in JPEG-LS compression will carry an embedded watermark bit.

Secret data key 208 is used to keep the watermark values less readily detected by unauthorized users. In one implementation, secret data key 208 is a complete keying sequence corresponding to the end or run locations in an image suitable for watermarking. Alternatively, secret data key 208 can instead be used as a seed for a pseudo-random generator that then creates the keying sequence needed for watermarking. In either of these or other implementations, the keying sequence associated with the secret data key 208 has a keying bit in the sequence set to a '1' value to indicate the corresponding end or run includes a watermark bit value and has a keying bit in the sequence set to a '0' value to indicate the corresponding end or run in the image does not includes a watermark value.

To further avoid detection of the watermark, a random bit value could be inserted in the end of run location corresponding to a keying sequence having a '0' value entry. This approach increases the difficulty in identifying the watermark without secret data key 208 or keying sequence as any pattern caused by the embedded watermark appears more randomly. Consequently, unauthorized users without secret data key 208 cannot simply search for redundant codeword values transmitted in the compressed data stream to determine the watermark. For example, the appearance of a redundant codeword in a compressed datastream would not necessarily correspond to any value in the watermark as it might be inserted randomly in accordance with implementations of the present invention. This helps keep the watermark information secret even from users operating a decompressor enhanced in accordance with implementations of the present invention.

Figure 3:
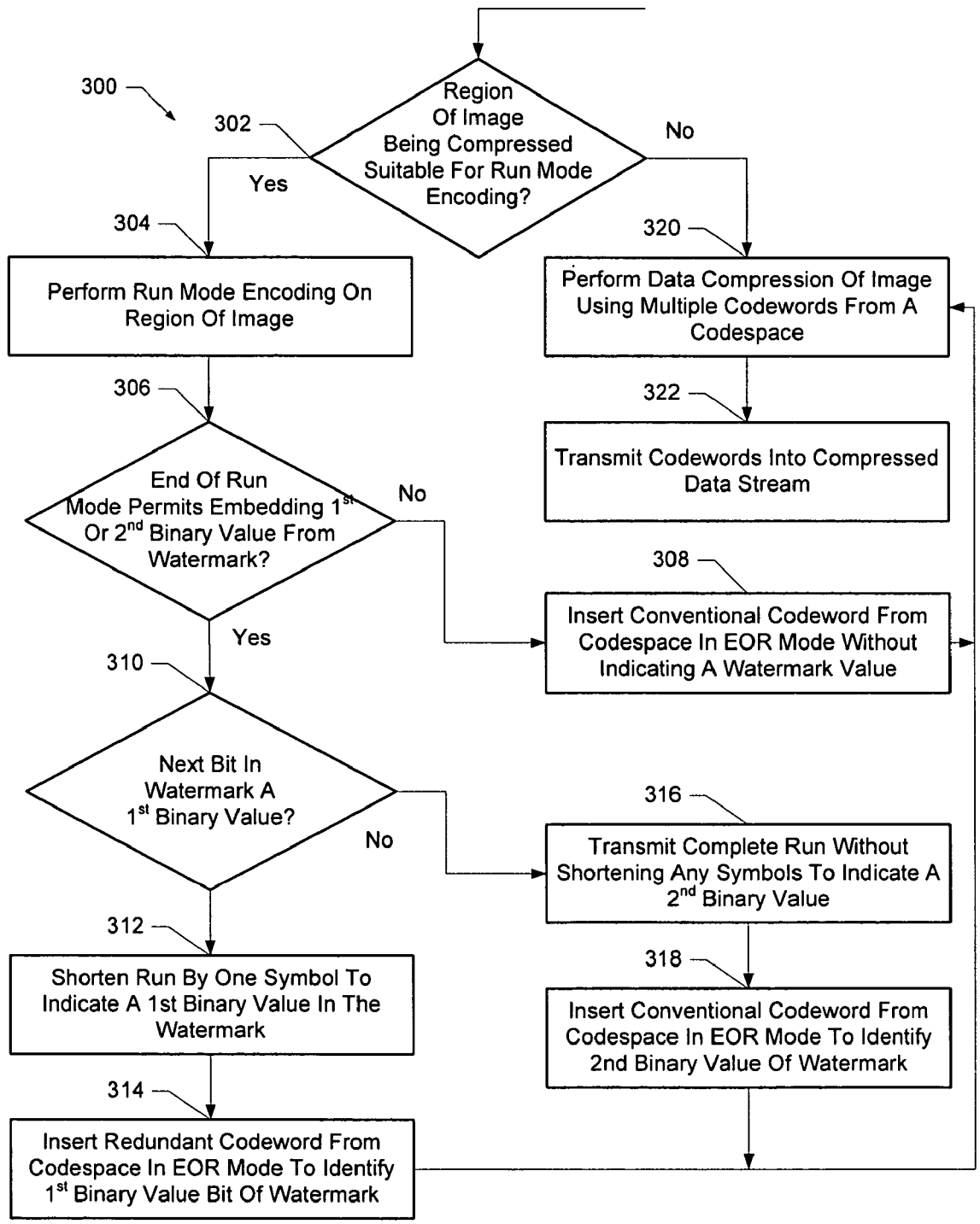
FIG. 3 is a flowchart diagram providing compression and watermark embedding operations in accordance with one implementation of the present invention.

FIG. 3 is a flowchart diagram providing compression and watermark embedding operation 300 in accordance with one implementation of the present invention. While these operations are designed around JPEG-LS and its variants, it can also potentially be applied to any compression operation using a combination of run mode encoding and codeword or table-driven encoding.

Initially, the compression encoder of the present invention determines if the region of an image being compressed is suitable for run mode encoding (302). Typically, a "flat" area or region of the image without edges is represented by a repeated value and can be effectively compressed with run mode encoding. Implementations of the present invention perform the run mode encoding operation on a region of an image by identifying a repeated data value for a repeat count (304). In the lossless mode of JPEG-LS, the run mode encoding is only applied when a causal template detects a "flat context" in the region of the image as described in further detail later herein. Alternatively, the watermarking could also be applied in the JPEG-LS "near-lossless" mode that allows decompressed samples in the causal template to differ from the original by a relatively small amount and still be considered within the "flat context".

Before encoding the run, the compression encoder determines if the end of run condition further permits embedding either a $1^{st}$ or $2^{nd}$ binary value from the watermark in accordance with implementations of the present invention (306). Some compression operations can always use implementations of the present invention to embed either a '0' or '1' watermark value in the compressed data stream. Other compression operations, like JPEG-LS, are generally capable of embedding a binary '0' or '1' value unless certain data conditions occur in the stream of values preceding the end of run. The particular context and stream of values allowing or disallowing JPEG-LS to embed a watermark value in accordance with implementations of the present invention is described in further detail later herein.

If the end of run condition does not permit embedding of a watermark, as occasionally might occur with JPEG-LS and its variants, the compression operation inserts a conventional codeword from the codespace in the EOR mode without indicating a watermark value (308). For example, the conventional codeword in EOR mode generally corresponds to the symbol that broke the run.

Alternatively, if the end of run condition does permit embedding either a first or second binary value then the next binary value in the watermark determines how the embedding occurs. In one implementation, embedding a first binary value in the watermark (310) includes shortening the current run by one symbol to indicate a $1^{st}$ binary value in the watermark (312). For example, a run of 20 symbols corresponding to the letter "a" is shortened by one symbol to 19 symbols of the letter "a". To make up for the shortened run, implementations of the present invention then inserts a redundant codeword from the codespace in the EOR mode to identify $1^{st}$ binary value bit of watermark embedded therein (314). The redundant codeword is selected as it is a valid codeword in the codespace yet not generally used by the conventional encoder or decoder pair in normal operation. Consequently, a compression decoder enhanced in accordance with implementations of the present invention encountering the redundant codeword determines that a $1^{st}$ binary value from the watermark has been embedded.

In any event, both the conventional and enhanced compression decoder encountering the redundant codeword respond by extending the run received by one run length value (i.e., by substituting the most recent run symbol in place of the redundant codeword) thereby restoring the original run length. In an alternate implementation of the present invention, the run is shortened by a variable number of symbols upon encoding to include more watermark information or accommodate larger watermark bit streams; on decode the variable number of symbols are also restored in a manner analogous to the operation described previously. This latter implementation shortens the run depending on the size of the watermark, the number of bits to be embedded in each EOR mode and the reduced efficiency of compression to be tolerated.

Instead of a first binary value, embedding a second binary value in the watermark (310) is achieved by transmitting the complete run without shortening (316). Essentially, the second binary value is embedded by performing the processing associated with the EOR mode using a conventional encoder without watermark capabilities. Implementations of the present invention inserts a conventional codeword from the codespace in the EOR mode to further identify the $2^{nd}$ binary value of the watermark (318). The conventional codeword for the $2^{nd}$ binary value includes a conventional codeword from the codespace rather than the redundant codeword as previously described in conjunction with embedding a $1^{st}$ binary value. On the decoder, the $2^{nd}$ binary value from the watermark is determined when the decoder concludes that the encoder could have shortened the run to embed a $1^{st}$ binary value in accordance with the present invention but did not.

Figure 4:
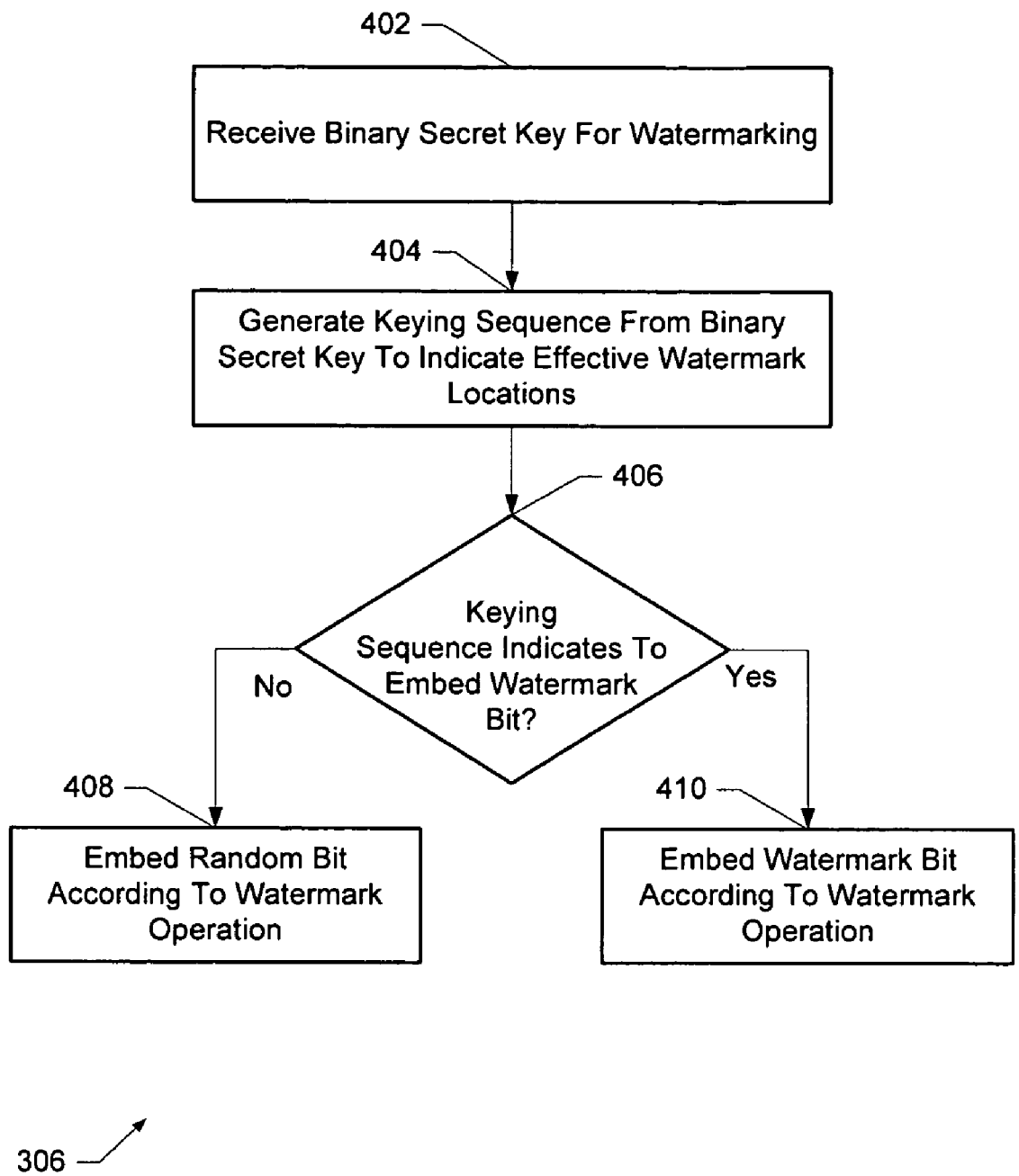
FIG. 4 is a flowchart diagram of the operations for keying a watermark embedded in accordance with implementations of the present invention.

FIG. 4 is a flowchart diagram of the operations for keying a watermark embedded in accordance with implementations of the present invention. Keying can be performed in one implementation of the present invention at 306 in FIG. 3 as one additional condition when determining if a watermark should be embedded in the datastream. For example, if the watermark can be embedded yet a keying sequence indicates otherwise then no watermark is embedded in the datastream.

In one implementation, a user or application provides a binary secret key associated with embedding the watermark (402). The key is typically not part of the image being compressed and/or being transmitted and available only to users or applications authorized to not only decompress the data but also to have access to the watermark.

Next, a keying operation designed in accordance with one implementation of the present invention generates a keying sequence from the binary secret key that indicates effective watermark locations (404). As previously described, the keying operation can generate a keying sequence in one implementation of the present invention using a pseudo-random generator based on the binary secret key. The length of keying sequence is as long as the number of potential watermark locations in the data. Bits in the keying sequence determine whether a particular end of run position in the compressed data stream should have an embedded watermark value or not. Alternatively, the keying operation uses the binary secret key as the keying sequence directly. In this latter case, the secret key is as long as the number of potential watermark locations in the data and requires no further processing to obtain the keying sequence.

It is contemplated that the keying sequence takes in account that embedding a watermark value is often a context sensitive decision. Consequently, generating the keying sequence may also include analyzing datastream values in light of the compression operation being applied to the datastream values. If it is required, the decision whether to embed a watermark value is made in real-time or on a separate pass prior to the compression. For example, not all EOR mode conditions using JPEG-LS compression can be used in accordance with implementations of the present invention to embed watermark values due to the occurrence of certain combinations of data values from the datastream.

If a location in the datastream can embed a watermark bit value and the keying sequence indicator concurs (406) then a watermark bit is embedded in accordance with implementations of the present invention (410). As previously described, the security of the watermark can be increased by entering a random bit (408) even when the keying sequence indicates that a watermark bit should not be embedded (410). The one or more random bits embedded in the datastream are likely to increase the difficulty of an unauthorized party from attempting to extract the watermark when using the decoder without the benefit of the keying sequence. For example, the unauthorized party operating without the keying sequence may in fact extract values encoded using the watermark operation that actually contain random data rather than values from the actual watermark.

Figure 5:
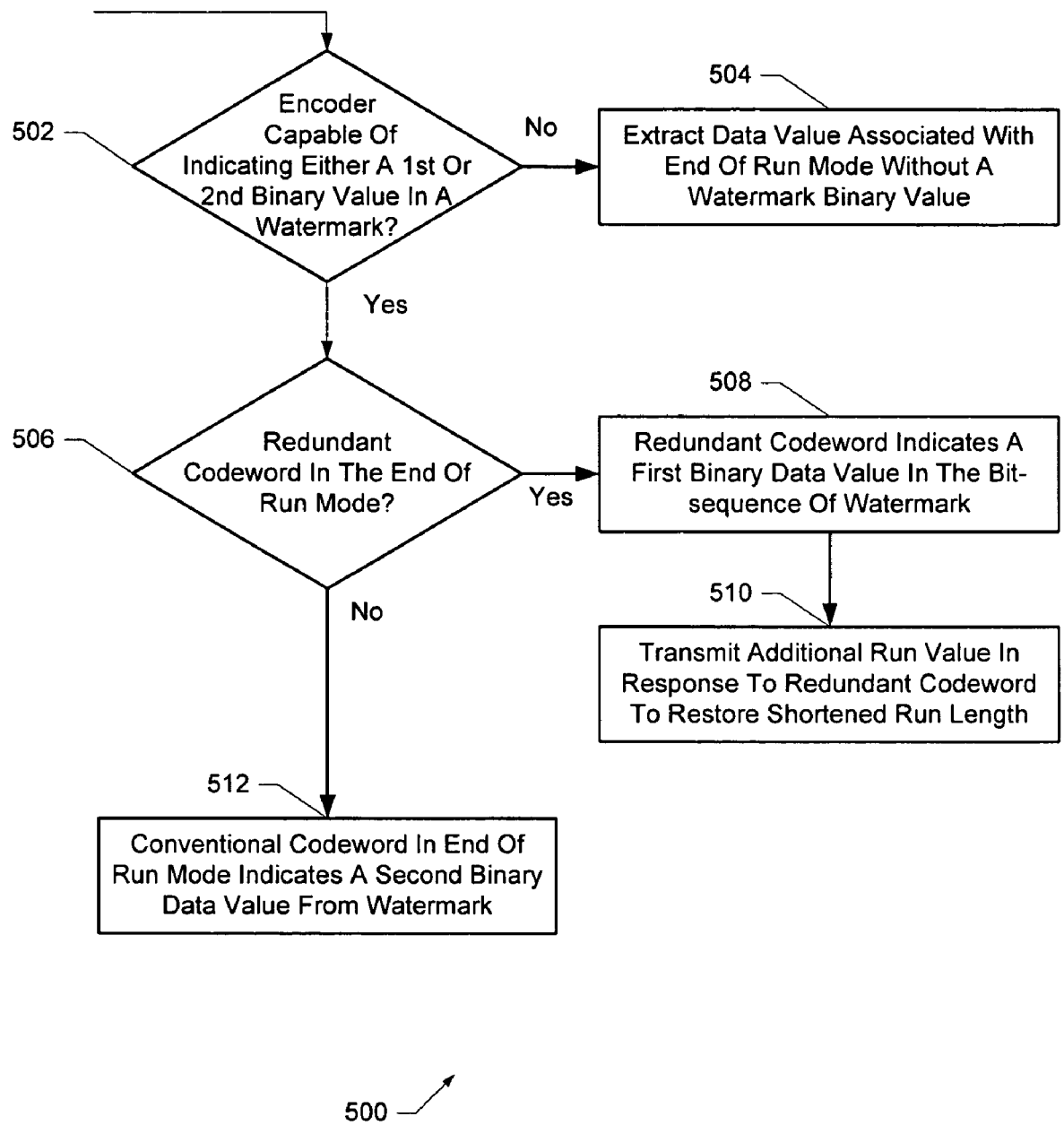
FIG. 5 is a flowchart diagram of the operations for extracting the watermark bit-sequence from a data stream compressed in accordance with implementations of the present invention.

FIG. 5 is a flowchart diagram of the operations for extracting the watermark bit-sequence from a data stream compressed in accordance with the present invention. A decompression module begins the watermark extracting operation upon the first encounter with an EOR mode after the end of a run. The decompressor module determines if the encoder was capable of indicating either a 1st or 2nd binary value from the watermark bit-sequence in the EOR mode and in accordance with implementations of the present invention (503). Implementations of the present invention require that the EOR mode is capable of carrying either a first or second binary value even though only one binary value is ultimately transmitted. This is because only one binary value is positively indicated. The second binary value is implied by the absence of the first binary value. For example, the second binary value is detected when an EOR mode is not embedded with a first binary value even though it was possible for the encoder to have done so. Consequently, if both the first and second binary could not have been embedded then a data value in EOR mode is extracted without a watermark binary value (504). For example, JPEG-LS may be able to embed a first binary value but not the second binary value in the EOR mode due to certain data conditions or constraints occurring in the data stream being compressed. Further details on the occurrence of this condition in JPEG-LS is described later herein.

Notwithstanding the keying sequence, implementations of the present invention assume that each end of run has an embedded watermark value if it were possible for the compression operation to embed either the first binary value or the second binary value. In one implementation, the decompressor detects a redundant codeword in the EOR mode (506) and indicates that the next value in the bit-sequence of the watermark is a first binary value (508). Because the compression encoder shortened the run length by one symbol, the decompression decoder transmits a restored run length value or restored run in response to the redundant codeword thus returning the shortened run to the original run length.

In the event a conventional codeword from the codespace is used in the EOR mode (512) rather than the redundant codeword, the decompression decoder indicates a second binary data value in the bit-sequence of values in the watermark (514). For example, implementations of the present invention assume that the conventional codeword transmitted in the EOR mode implies a second binary value for the watermark if the compressor could have transmitted a first binary value and did not choose to do so.

Figure 6A:
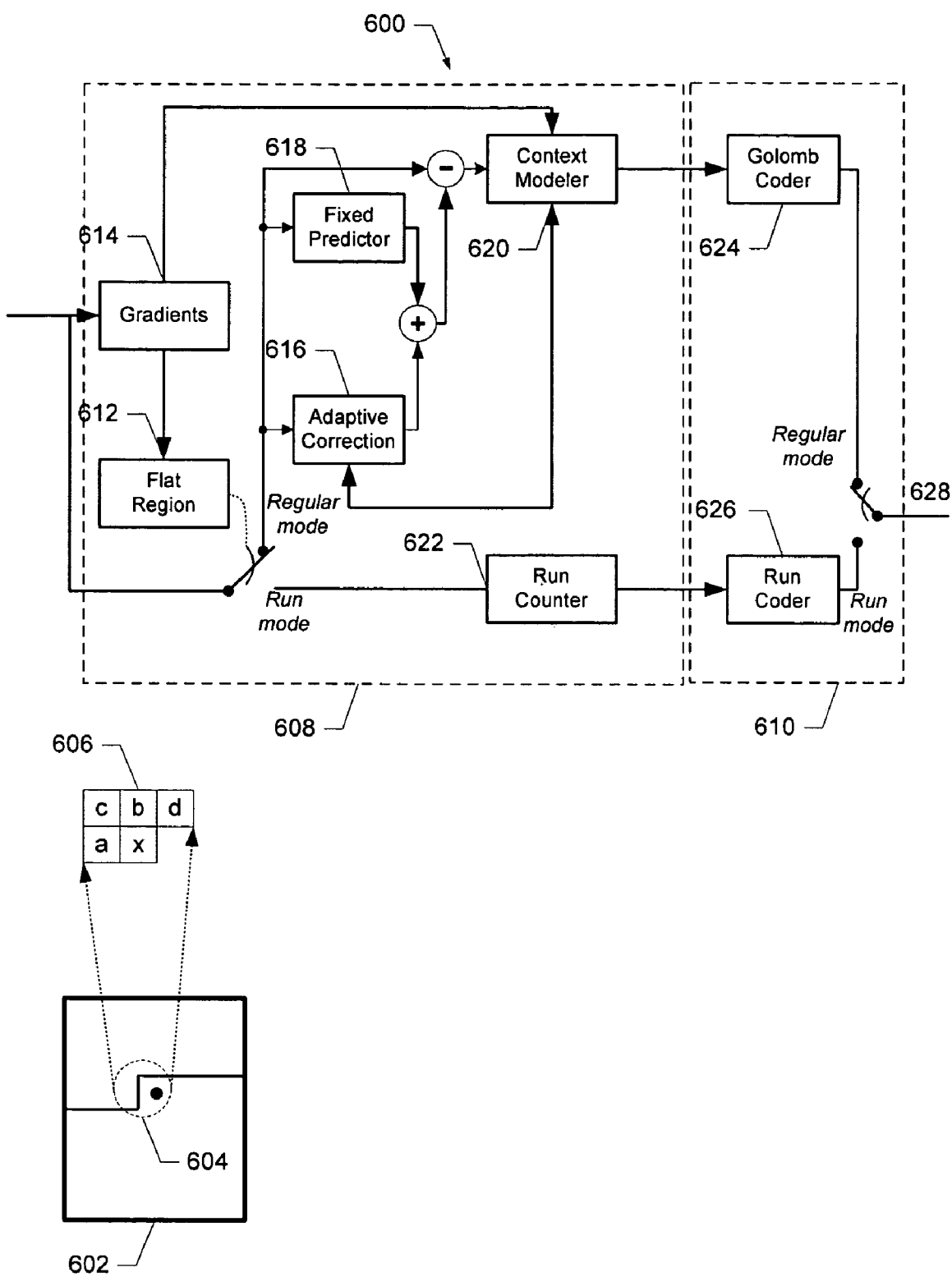
FIG. 6A and FIG. 6B provide a schematic of the components and operations used by JPEG-LS to compress an image.
Figure 6B:
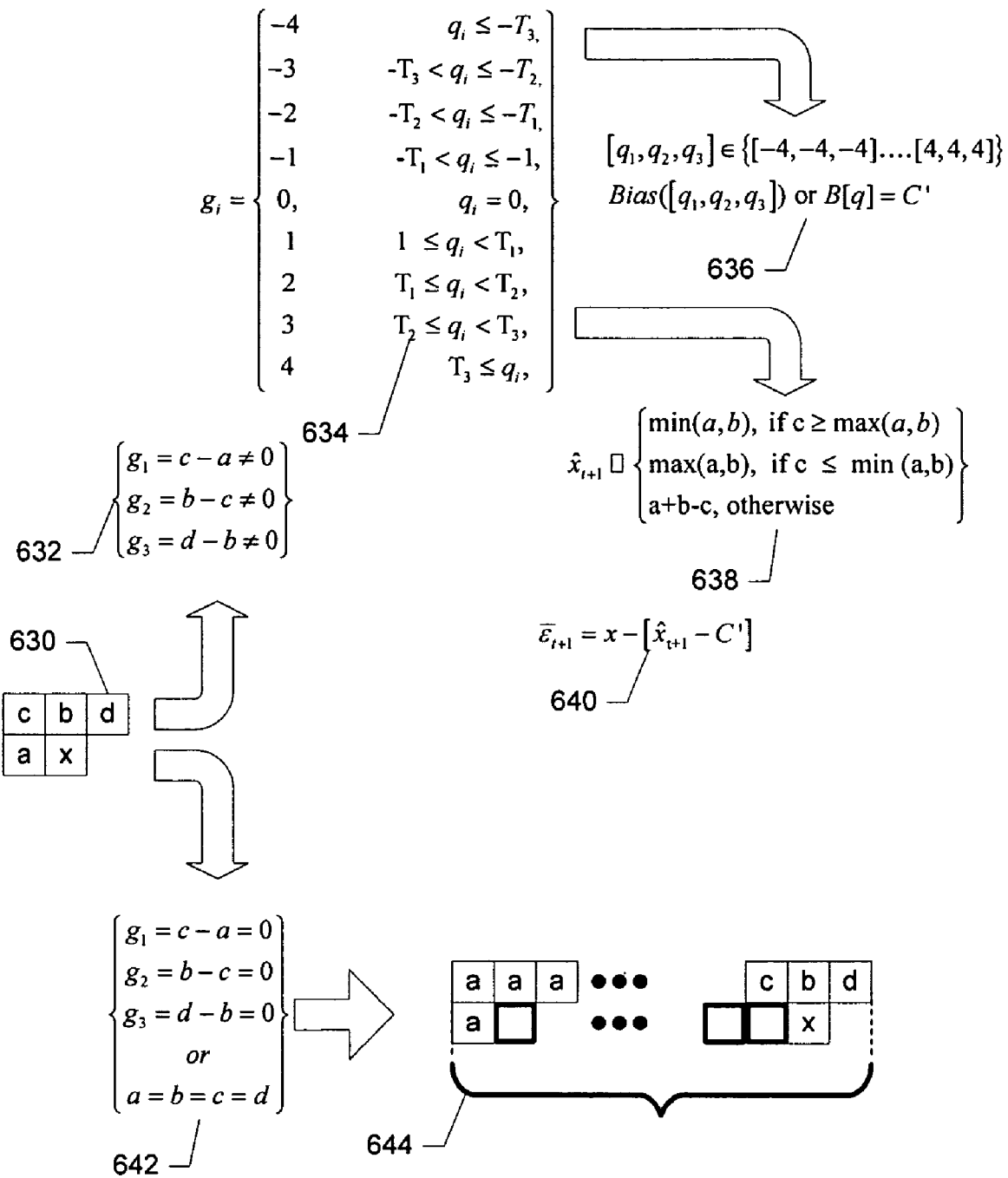

FIG. 6A and FIG. 6B provide a schematic of the components and operations used by JPEG-LS 600 to compress an image. JPEG-LS 600 has two main coding modes: a run mode used to compress regions of an image deemed to be "flat" and a regular mode to compress pixel values in a "non-flat" region. The flat region contains a sequence of pixels identical in value thus capable of being represented as a repetition count. To further compress in run mode, JPEG-LS 600 represents the repetition count with variable length codewords. The shorter codewords are reserved for representing repetition counts in the run occurring more frequently while longer codewords represent those repetition counts considered to occur less frequently.

In the regular mode, JPEG-LS 600 further includes two distinct submodes: an end of run (EOR) mode and a normal mode. EOR mode is used in JPEG-LS 600 to describe the pixel values causing the break in a run and the eventual switch to regular mode. When JPEG-LS operates in lossless mode, any value not equal to the run length value is capable of breaking the run. In comparison, JPEG-LS operating in near lossless mode in JPEG-LS allows a run to continue until broken by samples in the image differing by a threshold amount. In comparison, normal mode in JPEG-LS is used to compress values that fall in neither of the EOR modes or the run mode. For brevity, reference made to an EOR mode contemplates application to JPEG-LS operating in either the lossless or near lossless modalities.

In comparison, both EOR mode and normal mode transmit data predictively but calculate the predictive errors differently. Accordingly, the error prediction performed in the EOR mode in JPEG-LS is used by one implementation of the present invention to embed watermark values. Nonetheless, it is useful to understand other aspects of JPEG-LS as illustrated and described in conjunction with FIG. 6A and FIG. 6B. With that background, FIG. 7 and FIG. 8 provide examples of the operations and pseudocode associated with watermark embedding using the EOR mode of JPEG-LS in accordance with implementations of the present invention.

Components in FIG. 6A for performing JPEG-LS compression include an image region 604 sampled from an image 602, a template 606, a modeler 608 and a coder 610. In operation, modeler 608 determines whether a portion of an image is suitable for run mode compression or regular mode compression. If values sampled in template 606 indicate a flat region than then a set of parameters for run mode encoding are produced and passed to coder 610 for encoding into a run mode encoded and compressed output stream 628. Alternatively, if the values in template indicate edges or non-flat areas then parameters are generated to describe the codewords for these types of areas and also passed to coder 610 for coding into the various different codewords.

Within modeler 608 are a flat region component 612, a gradient component 614, an adaptive correction component 616, a fixed predictor component 618, a context modeler component 620 and a run counter component 622. Flat region component 612 evaluates the template values in template 606 and switches modeler 608 into a run mode if the region is considered flat or homogeneous. Run counter component 622 takes advantage of the smoothness in the region and inherent redundancies when generating parameters used with different types of run mode encoding. JPEG-LS and related compression operations remain in run mode until an end of line is encountered or a value in the scan line does not match the run length value associated with the current run and breaks the run.

When the run is broken by a non-matching sample, modeler 608 uses gradient component 614 to generate parameters for encoding subsequent values in a regular mode rather than the run mode encoding. The first value encoded after the end of run typically encodes the non-matching sample that broke the run and is transmitted through the EOR mode. Details on calculating the predictive error associated with the EOR mode and transmission of the sample breaking the run is illustrated in FIG. 7 and described in further detail later herein.

Referring back to FIG. 6A, fixed predictor 618 generates an initial prediction describing the local characteristics of pixels in template 606 once in normal mode. A bias produced by adaptive correction component 616 refines the initial prediction value based on a particular context selected. The combination of the initial prediction and bias is provided to context modeler 620 which then generates parameters used by Golomb coder 624. Golomb coder 624 encodes the error or residual compared with the initial prediction value and transmits the results into a compressed output 628.

FIG. 6B illustrates aspects of encoding an image in accordance with one implementation of JPEG-LS and related variants used for compression. A template 630 contains a set of sample values from an image taken along a pair of scan lines. In particular, the x value is being encoded using sample values in the vicinity of x identified as a, b, c and d and positioned as illustrated.

A set of gradients ($g_1$, $g_2$, $g_3$) are computed as illustrated to determine if a region is considered flat and homogenous or non-flat and having edges. Gradient condition 642 indicates a relative homogenous region thus justifying run mode type encoding 644. For example, the empty boxes in run mode type encoding 644 indicates a run of values represented by the letter 'a'. Run mode encoding is an efficient mechanism for encoding like values in a region but not for non-flat regions of an image having edges. Alternatively, gradient condition 632 indicates that the region in template 630 is not homogeneous or rather contains edges and should be encoded using a more complex characteristic associated with the regular mode of compression. While FIG. 6A refers specifically to the encoder, it is worth noting that the decoder uses similar logic to determine if the region is considered flat or non-flat. In particular, the decoder is able to make a determination based on the previously processed sample and does not rely on additional outside or side information other than this previous sample data.

In the regular mode, the JPEG-LS compression model quantizes the gradients into a triplet of gradient values 636 ($g_1$, $g_2$, $g_3$) and a range of values: [$q_1$, $q_2$, $q_3$]$\in$\{[-4, -4, -4] . . . [4, 4, 4]\} where the leading nonzero coordinate, if any, is a positive value and [0, 0, 0] is indicative of the run mode encoding condition as described previously. The default threshold values in 634 are specified in the JPEG-LS standard as $T_1$=3, $T_2$=7 and $T_3$=21 and facilitate mapping the gradients values into the triplet values. Quantized triplet values 636 are used to select a context (q) and determine a bias B[q] for adjusting an initial predication of the value x being encoded in this regular. After some coding reductions, the context q corresponds to one of 365 coding contexts determined most suitable for the pixel activity in the particular region of the image. Accordingly, the prediction correction amount C' refines the initial prediction and more accurately determines the prediction error eventually sent in the compressed data stream.

Initial prediction 638 $\hat{x}_{t+1}$ is determined through the relatively straightforward selection criteria as indicated. The first inequality for selecting $\hat{x}_{t+1}$ provides some indication that region should use min (a, b) for $\hat{x}_{t+1}$ while the second inequality provides an indication that the region instead should use max (a, b) to initially predict $\hat{x}_{t+1}$. Otherwise, $\hat{x}_{t+1}$ is instead initially predicted using a combination of values a+b−c from the causal template. To improve the accuracy, the prediction error $\epsilon_{t+1}$ is corrected by the previously described prediction correction amount C' and then entered into the compressed data stream while JPEG-LS is in regular context mode compression. The corrected prediction error $\bar{\epsilon}_{t+1}$ is calculated as illustrated by subtracting the refined predicted value (i.e., [$\hat{x}_{t+1}$−C']) from the value in the template being compressed x.

Referring now to FIG. 7, causal template 702 illustrates the EOR mode occurring after a run and is used to embed a watermark in accordance with implementations of the present invention. This EOR mode in JPEG-LS occurs immediately after a run is broken and before entering normal mode compression described above. In lossless mode, for example, the run is broken when the next sample is not equal to the previous run value. In the illustrated example, four pixels on the leftmost portion of the two scan lines surrounding the next pixel to encode (i.e., "x") in causal template 702 have equal values as indicated by the symbol/letter 'a'. The blank boxes also correspond to a run of the letter 'a' previously mentioned. Alternatively, the four pixels on these scan lines could be represented as having a gradient of zero as illustrated in 642 in FIG. 6B as the values in positions a, b, c and d are equal. At this point, the compressor is in run mode as previously described and enters a repetition count corresponding to the number of values or consecutive letters 'a' indicated on the scan line.

As causal template 702 moves further over the region of the image, a change in the run value causes a break . In particular, the break in the run is due to the current value x not being equal to 'a' (i.e., x≠a). JPEG-LS leaves run mode encoding and uses EOR mode rules 704 to compute the predicted value $\hat{x}_{t+1}$ at the end of run based upon the relationship $\hat{x}_{t+1}\square$b as indicated in step 1) of 704. Essentially, the value of $\hat{x}_{t+1}$ is predicted by the value 'b' appearing above x in causal template 702. The prediction error for x is 2) $\epsilon_{t+1}$=x−$\hat{x}_{t+1}$ or by substitution with the relationship in step 1) of 704 $\epsilon_{t+1}$=x−b.

A careful review of these relationships in the EOR mode in JPEG-LS, provides a redundant symbol in the codespace available for embedding a watermark. In particular, while in EOR mode in step 3) x≠a as the run of 'a' could not be broken by 'a'; subtracting $\hat{x}_{t+1}$ from both sides results in x−$\hat{x}_{t+1}$≠a−$\hat{x}_{t+1}$ and $\hat{\epsilon}_{t+1}$≠a−b by substitution. Consequently, in step 3) of 704 $\hat{\epsilon}_{t+1}$≠a−b represents the redundant symbol available for embedding a watermark in accordance with implementations of the present invention as applied to JPEG-LS.

It is important to note, however, that $\epsilon_{t+1}$≠a−b is only available for use if the context and values in template 702 permit. A first end of run condition in which b=a identified as EOR(b=a) does not have a redundant codeword to embed a watermark. Namely, if b=a then x≠b contrary to the prediction since x broke the run with a non-'a' value. This also implies the error prediction of x-b is non-zero and thus all non-zero values are possible codewords. Zero, the only possible redundant codeword under these conditions yet it is not available as JPEG-LS has removed it from the codebook under EOR(b=a).

However, the second end of run condition in which b≠a or EOR(b≠a) does in fact yield a redundant codeword to be used in accordance with implementations of the present invention. Essentially, EOR(b≠a) provides that $\epsilon_{t+1}$≠a−b and one non-zero value remains unused since a and b are clearly different values. While the error transmitted $\epsilon_{t+1}$ does not normally use the non-zero codeword of a−b, it was left in the codebook for ease of implementation. By design, it was determined that removing the non-zero codeword of a−b from the JPEG-LS codebook was complex and for simplicity it would be easier to leave it in. Accordingly, implementations of the present invention exploit this vestigial redundant codeword to facilitate embedding the watermark bitstream.

In the context of embedding a watermark binary value, a determination is made per 306 in FIG. 3 that a redundant symbol exists in the EOR mode of JPEG-LS by checking the condition of EOR(b≠a) and determining the redundant symbol a−b dynamically from causal template 702. In one implementation of the present invention, this redundant symbol for JPEG-LS is used to send a $1^{st}$ binary value (e.g., a binary value of "1") after sending a shortened run as also described in conjunction with 312 and 314 in FIG. 3. Likewise, the $2^{nd}$ binary value (e.g., a binary value of "0") in JPEG-LS corresponding to a watermark is sent by not transmitting the redundant value in accordance with 316 and 318 also in FIG. 3; instead a complete run is transmitted and the EOR mode uses a conventional codeword from the codespace.

On the decoder, the JPEG-LS decoder enhanced in accordance with implementations of the present invention finds the redundant codeword and EOR(b≠a) to determine that a $1^{st}$ binary value corresponding to the watermark was transmitted. Likewise, if the JPEG-LS decoder finds no redundant symbol and EOR(b≠a) then decoder must have elected to transmit a $2^{nd}$ binary value corresponding to the watermark.

Whether transmitting a $1^{st}$ binary value or $2^{nd}$ binary value from the watermark in JPEG-LS, both the encoder and decoder attempt to overlay the causal template over both an unshortened (i.e., full run length) version and a shortened run length version to determine whether a $1^{st}$ binary value or $2^{nd}$ binary value could have been transmitted. In accordance with implementations of the present invention, it is observed that the $2^{nd}$ binary value can only be transmitted if it were also possible to have also shortened the run by one symbol and transmitted a $1^{st}$ binary value instead. To make this determination, both encoder and decoder effectively slide causal template 702 back one symbol to check not only whether (b≠a) but instead effectively whether (c≠a). This latter determination indicates that the encoder could have shortened the run in accordance with implementations of the present invention to embed a $1^{st}$ binary value from the watermark had it been required. More importantly, these tests ensure that decoder can subsequently detect a $2^{nd}$ binary value for the watermark as a deliberate action by the decoder not to embed a $1^{st}$ binary value for the watermark and vice-versa.

FIG. 7 also illustrates a more tangible example of identifying the redundant codeword in JPEG-LS as it is used for watermarking purposes in EOR mode. In this example, run condition 708 is illustrated by symbols a, b, c, d set to '57' while x indicates the value being compressed. As described above in association with causal template 702, the initial position of causal template 708 over the image region indicates a common value of 57 in each cell thus causing JPEG-LS to enter run mode compression. As causal template 708 moves further over the region of the image, a break in the run mode encoding occurs due to a change in the value where x≠a or in this case x≠57.

JPEG-LS leaves run mode encoding and uses the EOR mode rules 710 to compute the predicted value $\hat{x}_{t+1}$ at the end of run according to the relationship $\hat{x}_{t+1}$□3 as indicated in step 1). According to step 2) the prediction error $\epsilon_{t+1}$ is determined as $x-\hat{x}_{t+1}=x-3$. Conversely, this also implies that prediction error $\epsilon_{t+1}$ could not equal 54 as x≠57. Given the particular values in the EOR mode in this example, '54' is the redundant codeword 712 used to facilitate transmission of either a first or second binary value from a sequence of bits in a watermark since $\epsilon_{t+1}$≠a−b=57−3=54. In particular, the compressor uses the redundant codeword when the run is shortened (i.e., $\epsilon_t$=54) and when the run is not shortened then the compressor does not use the redundant codeword (i.e., $\epsilon_{t+1}$≠54)

FIG. 8 provides a pair of pseudocode segments illustrating both watermark encoder pseudocode 802 and decoder pseudocode 804 implemented in accordance with the present invention and using JPEG-LS compression. In this example, JPEG-LS is initially performing run mode encoding of a symbol "a". Eventually, the JPEG-LS encoder encounters a symbol represented by "x" causing a break in the run and a potential opportunity to embed a watermark bit by way of encoder pseudocode segment 802. Image region 804 illustrates a sample set of values being considered by encoder pseudocode segment 802.

At the time of the break caused by "x", the symbol "a" has been repeated in the run "k" times. However, before even checking what watermark binary value is to potentially be embedded, encoder pseudocode segment 802 first checks whether c!=a. This determination is necessary in the event the next watermark value "w" is a first binary value encoded by shortening the run and sliding the causal template back one symbol over region 804. Of course, if "w" in fact does contain a first binary value then the run length is in fact shortened (i.e., k−1) and now it is certain that the redundant code in JPEG-LS is available in EOR(b!=a) mode. Alternatively, if "w" contains a second binary value then the run length is not shortened and "k" is left alone. The mere fact that the encoder could have shortened the run to accommodate the first binary value is sufficient information for the decoder to later detect the occurrence of either the first or second binary value. Finally, if it is initially determined that c==a then no watermark can be embedded in the EOR mode as the redundant codeword is not available in EOR(b==a) when the run is potentially shortened.

Decoder pseudocode segment 806 in FIG. 8 operating on a region 808 illustrates the reverse logic employed by encoder pseudocode segment 802. In this example, values c, b, d, and a are known values while the value represented by "x" remains unknown and subject to decompression. Further, decoder pseudocode segment 806 is decoding a repetition of values "a" and evaluating whether the EOR mode also includes a watermark.

First, decoder pseudocode segment 806 checks if b==a as this would have precluded the encoder from potentially embedding both a first binary value and second binary value from the watermark. Specifically, the redundant codeword is necessary to embed a first binary value from the watermark yet is not available when EOR(b==a). Likewise, the decoder can only detect the second binary value if the omission of the first binary value from the encoder was deliberate as previously described. Since b==a, the encoder did not deliberately omit the first binary value as the redundant codeword was unavailable based on the image data encountered in the EOR mode.

In contrast, a first binary value or second binary value from the watermark is embedded in region 808 when b!=a. Assuming there is a watermark value to embed, EOR(b!=a) provides the encoder with the option to include or leave out the redundant code depending on the next watermark value "w". Accordingly, if decoder pseudocode segment 806 encounters the condition that both EOR(b!=a) and x==a then the next watermark value "w" should be set to the first binary value. Although it is not depicted explicitly, the decoder interprets the redundant codeword inserted by the encoder as additional run value 'a' thus causing the condition x==a.

In the event the redundant codeword was available but not used, decoder pseudocode segment 806 encounters x!=a and a normal or complete run. This is the expected condition in both conventional decoders and an enhanced decoder in accordance with the present invention since x!=a is the normal condition that breaks a the run. In accordance with implementations of the present invention, however, decoder pseudocode segment 806 further checks if c!=a to determine if the encoder could have shortened the run to embed the first binary value instead. Consequently if c!=a then the decoder deduces that the encoder deliberately did not shorten the run and insert the redundant code because the next watermark value was instead the second binary value.

Figure 9:
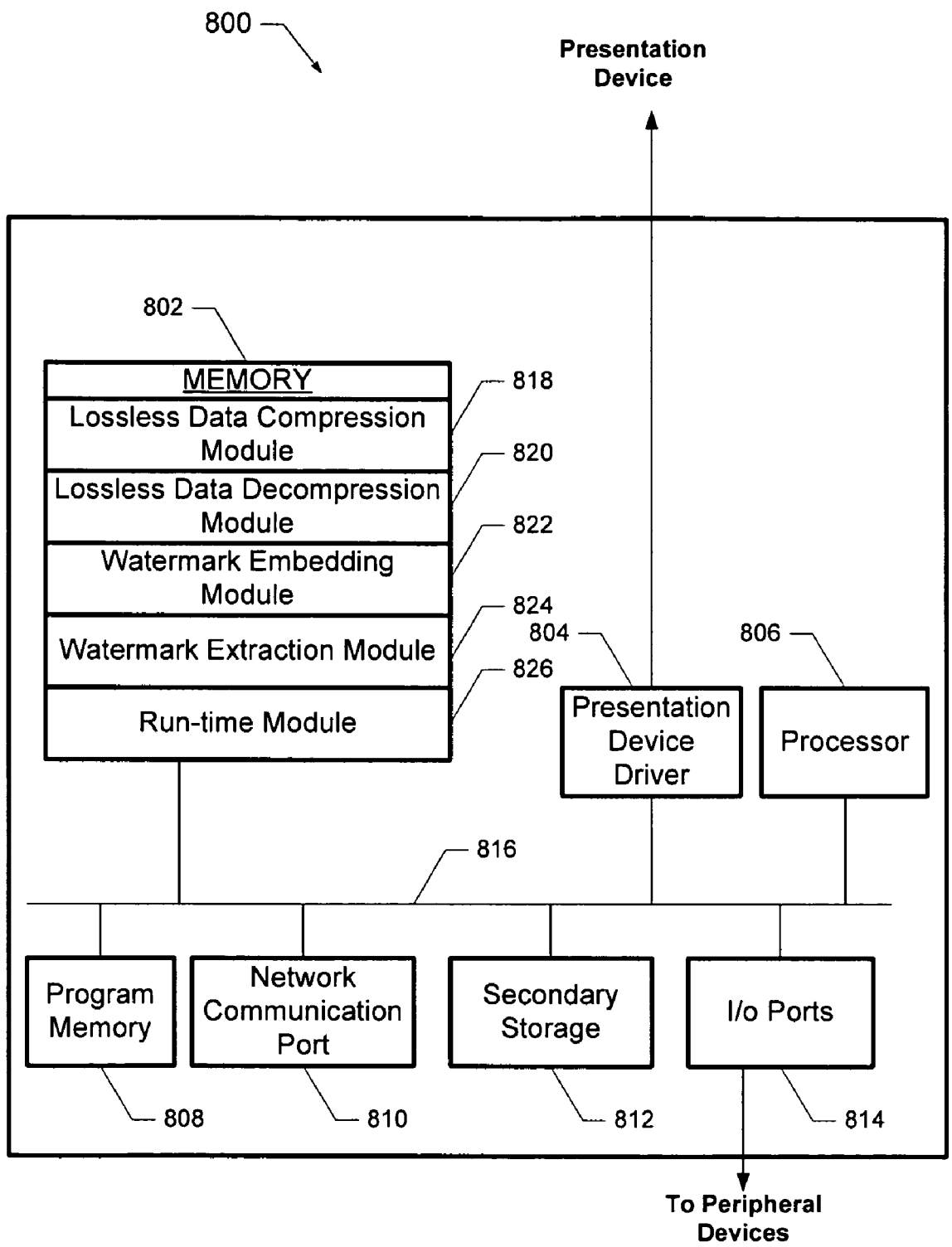
FIG. 9 is a block diagram of a system used for performing the apparatus or methods in accordance with implementations of the present invention.

FIG. 9 is a block diagram of a system 900 used in one implementation for performing the apparatus or methods of the present invention. System 900 includes a memory 902 to hold executing programs (typically random access memory (RAM) or writable read-only memory (ROM) such as a flash ROM), a presentation device driver 904 capable of interfacing and driving a display or output device, a processor 906, a program memory 908 for holding drivers or other frequently used programs, a network communication port 910 for data communication, a secondary storage 912 with secondary storage controller, and input/output (I/O) ports 914 also with I/O controller operatively coupled together over a bus 916. The system 900 can be preprogrammed, in ROM, for example, using field-programmable gate array (FPGA) technology or it can be programmed (and reprogrammed) by loading a program from another source (for example, from a floppy disk, a CD-ROM, or another computer). Also, system 900 can be implemented using customized application specific integrated circuits (ASICs).

In one implementation, memory 902 includes a lossless data compression module 918, a lossless data decompression module 920, a watermark embedding module 922, a watermark extraction module 924 and a run-time module 926 that manages system resources used when processing one or more of the above components on system 900.

As previously described, lossless data compression module 918 can be implemented using any compression scheme that combines run mode encoding and codeword driven compression including JPEG-LS or its variants. Likewise, lossless decompression module 920 can also be implemented using the same combination of run mode and codeword driven decompression including JPEG-LS or its variants to decompress the previously compressed data stream.

Watermark embedding module 922 operates in accordance with implementations of the present invention to embed a bit-sequence corresponding to a watermark as previously described and watermark extraction module 824 reverses this process and extracts the embedded watermark. In an alternate implementation, lossless data compression/decompression and watermark embedding/extraction are implemented in a single module rather than multiple separate modules to facilitate ease of use and higher levels of integration.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; CD-ROM disks and, though stored in a more transitory manner, a network such as the Internet. Any of the foregoing can be supplemented by, or incorporated in, ASICs.

While specific embodiments have been described herein for purposes of illustration, various modifications may be made without departing from the spirit and scope of the invention. For example, implementation of the present invention are primarily described as conditionally shortening a run by one symbol upon encoding and then restoring the run length upon decode, however, an alternative implementation of the present invention could also shorten the run by a variable number of symbols upon encoding to include more watermark information or accommodate larger watermark bit streams. Instead of restoring the one symbol, the decoder would restore the variable number of symbols shortened in a manner analogous to the operation described previously. As previously described, this alternative implementation shortens the run depending on the size of the watermark, the number of bits to be embedded in each EOR mode and the reduced efficiency of compression to be tolerated.

Accordingly, the invention is not limited to the above-described implementations, but instead is defined by the appended claims in light of their full scope of equivalents.

What is claimed is:

1. A method of embedding a watermark bit-sequence in a compressed datastream, comprising:
   receiving a datastream of repeated data values for compression using a run mode encoding;
   determining if an end of run mode entered after the run mode encoding permits embedding either a first binary value or a second binary value from the watermark bit-sequence;
   transmitting a run length value to the compressed datastream for the run mode encoding that represents a shortened version of the datastream of repeated data values when the next bit in the watermark bit-sequence is a first binary value;
   appending to the compressed datastream a redundant codeword from a codespace in the end of run mode when the next bit in the watermark bit-sequence is a first binary value; and
   transmitting a run length value to the compressed datastream for the run mode encoding that represents an unshortened version of the datastream of repeated data values and indicates the next bit in the watermark bit-sequence is a second binary value; and
   appending to the compressed datastream a conventional codeword from the codespace in the end of run mode when the next bit in the watermark bit-sequence is a second binary value.

2. The method of claim 1 wherein the compressed datastream uses compression implemented according to a JPEG-LS compatible compression operation.

3. The method of claim 1 wherein the run mode encoding is performed when a template passing over a portion of an image indicates a flat region of the image.

4. The method of claim 3 wherein a set of gradients derived from the template passing over a region of the image indicates the flat region of the image.

5. The method of claim 1 wherein the run length value is decreased by one and corresponds to the shortened version of the datastream having one less repeated data value.

6. The method of claim 1 wherein the redundant codeword selected to indicate the end of run mode relies on a data value not equal to the repeated data values used to break the repeated data values.

7. The method of claim 1 wherein the redundant codeword is a valid codeword occurring in JPEG-LS while in an end of run (EOR) mode.

8. The method of claim 1 wherein the determining further comprises referring to a keying sequence of binary values to determine whether the next end of run mode should embed either a first binary value or second binary value from the watermark bit-sequence.

9. The method of claim 8 further comprising embedding a random binary value when the keying sequence indicates that the next end of run mode should not embed any value from the watermark bit-sequence.

10. A method of extracting a watermark bit-sequence from a compressed data stream, comprising:
   determining if an end of run mode entered after a run mode encoding of repeated data values was capable of being used to embed either a first binary value or a second binary value from a watermark bit-sequence;
   indicating a first binary value corresponding to the watermark in response to the determination and when the end of run mode uses a redundant codeword from the codespace; and
   indicating a second binary value corresponding to the watermark in response to the determination and when the end of run mode uses a conventional codeword from the codespace.

11. The method of claim 10 wherein indicating the first binary value further comprises:
   transmitting an incremented run length value to restore the shortened run length to an unshortened run length of repeated data values.

12. The method of claim 10 wherein a keying sequence of binary values is used to determine when an end of run mode includes a bit value from the watermark.

13. The method of claim 10 wherein the compressed data stream is implemented using a JPEG-LS compatible compression operation.

14. An apparatus for embedding a watermark bit-sequence in a datastream, comprises:
   a processor capable of executing instructions;
   a memory containing instructions when executed cause the processor to receive a datastream of repeated data values for compression using a run mode encoding, determine if an end of run mode entered after the run mode encoding permits embedding either a first binary value or a second binary value from the watermark bit-sequence, transmit a run length value to the compressed datastream for the run mode encoding that represents a shortened version of the datastream of repeated data values when the next bit in the watermark bit-sequence is a first binary value, append to the compressed datastream a redundant codeword from a codespace indicating the end of run mode when the next bit in the watermark bit-sequence is a first binary value and transmit a run length value to the compressed datastream for the run mode encoding that represents an unshortened version of the datastream of repeated data values and indicates the next bit in the watermark bit-sequence is a second binary value and append to the compressed datastream a conventional codeword from the codespace indicating the end of run mode when the next bit in the watermark bit-sequence is a second binary value.

15. The apparatus of claim 14 wherein the compressed datastream uses compression implemented according to a JPEG-LS compatible compression operation.

16. The apparatus of claim 14 wherein the run mode encoding is performed when a template passing over a portion of an image indicates a flat region of the image.

17. The apparatus of claim 16 wherein a set of gradients derived from the template passing over a region of the image indicates the flat region of the image.

18. The apparatus of claim 14 wherein the run length value is decreased by one and corresponds to the shortened version of the datastream having one less repeated data value.

19. The apparatus of claim 14 wherein the redundant codeword selected to indicate the end of run mode relies on a data value not equal to the repeated data values used to break the repeated data values.

20. The apparatus of claim 14 wherein the redundant codeword is a valid codeword occurring in JPEG-LS while in an end of run (EOR) mode.

21. The apparatus of claim 14 wherein the instructions used to determine further comprises instructions that refer to a keying sequence of binary values to determine whether the next end of run mode should embed either a first binary value or second binary value from the watermark bit-sequence.

22. The apparatus of claim 21 further comprising instructions when executed embed a random binary value when the keying sequence indicates that the next end of run mode should not embed any value from the watermark bit-sequence.

23. An apparatus for extracting a watermark bit-sequence from a compressed data stream, comprising:
   a processor capable of executing instructions;
   a memory containing instructions when executed determine if an end of run mode entered after a run mode encoding of repeated data values was capable of being used to embed either a first binary value or a second binary value from a watermark bit-sequence, indicate a first binary value corresponding to the watermark bit-sequence in response to the determination and when the end of run mode uses a redundant codeword from the codespace and indicate a second binary value corresponding to the watermark bit-sequence in response to the determination and when the end or run mode uses a codeword used in the codespace.

24. The apparatus of claim 23 wherein indicating the first binary value further comprises instructions when executed that transmit an incremented run length value to restore the shortened run length to an unshortened run length of repeated data values.

25. The apparatus of claim 23 wherein a keying sequence of binary values is used to determine when an end of run mode includes a bit value from the watermark bit-sequence.

26. The apparatus of claim 23 wherein the compressed data stream is implemented using a JPEG-LS compatible compression operation.

27. An apparatus for embedding a watermark bit-sequence in a compressed datastream, comprising:
   means for receiving a datastream of repeated data values for compression using a run mode encoding;
   means for determining if an end of run mode entered after the run mode encoding permits embedding either a first binary value or a second binary value from the watermark bit-sequence;
   means for transmitting a run length value to the compressed datastream for the run mode encoding that represents a shortened version of the datastream of repeated data values when the next bit in the watermark bit-sequence is a first binary value;

means for appending to the compressed datastream a redundant codeword from a codespace indicating the end of run mode when the next bit in the watermark bit-sequence is a first binary value; and means for transmitting a run length value to the compressed datastream for the run mode encoding that represents an unshortened version of the datastream of repeated data values and indicates the next bit in the watermark bit-sequence is a second binary value; and means for appending to the compressed datastream a conventional codeword from the codespace indicating the end of run mode when the next bit in the watermark bit-sequence is a second binary value.

28. An apparatus for extracting a watermark bit-sequence from a compressed data stream, comprising:

means for determining if an end of run mode entered after a run mode encoding of repeated data values was capable of being used to embed either a first binary value or a second binary value from a watermark bit-sequence;

means for indicating a first binary value corresponding to the watermark in response to the determination and when the end of run mode uses a redundant codeword from the codespace; and means for indicating a second binary value corresponding to the watermark in response to the determination and when the end of run mode uses a codeword used the codespace.

29. A computer program product for embedding a watermark bit-sequence in a compressed datastream, tangibly stored on a non-transitory computer readable medium, comprising instructions operable to cause a programmable processor to:

receive a datastream of repeated data values for compression using a run mode encoding;

determine if an end of run mode entered after the run mode encoding permits embedding either a first binary value or a second binary value from the watermark bit-sequence;

transmit a run length value to the compressed datastream for the run mode encoding that represents a shortened version of the datastream of repeated data values when the next bit in the watermark bit-sequence is a first binary value;

append to the compressed datastream a redundant codeword from a codespace in the end of run mode when the next bit in the watermark bit-sequence is a first binary value; and transmit a run length value to the compressed datastream for the run mode encoding that represents an unshortened version of the datastream of repeated data values and indicates the next bit in the watermark bit-sequence is a second binary value; and append to the compressed datastream a conventional codeword from the codespace in the end of run mode when the next bit in the watermark bit-sequence is a second binary value.

30. The computer program product of claim 29 wherein the compressed datastream uses compression implemented according to a JPEG-LS compatible compression operation.

31. The computer program product of claim 29 wherein the run mode encoding is performed when a template passing over a portion of an image indicates a flat region of the image.

32. The computer program product of claim 31 wherein a set of gradients derived from the template passing over a region of the image indicates the flat region of the image.

33. The computer program product of claim 29 wherein the run length value is decreased by one and corresponds to the shortened version of the datastream having one less repeated data value.

34. The computer program product of claim 29 wherein the redundant codeword selected to indicate the end of run mode relies on a data value not equal to the repeated data values used to break the repeated data values.

35. The computer program product of claim 29 wherein the redundant codeword is a valid codeword occurring in JPEG-LS while in an end of run (EOR) mode.

36. The computer program product of claim 29 wherein the instructions that determine further comprise instructions that refer to a keying sequence of binary values to determine whether the next end of run mode should embed either a first binary value or second binary value from the watermark bit-sequence.

37. The computer program product of claim 36 further comprising instructions that embed a random binary value when the keying sequence indicates that the next end of run mode should not embed any value from the watermark bit-sequence.

38. A computer program product for extracting a watermark bit-sequence from a compressed data stream, tangibly stored on a non-transitory computer readable medium, comprising instructions operable to cause a programmable processor to:

determine if an end of run mode entered after a run mode encoding of repeated data values was capable of being used to embed either a first binary value or a second binary value from a watermark bit-sequence;

indicate a first binary value corresponding to the watermark in response to the determination and when the end of run mode uses a redundant codeword from the codespace; and indicate a second binary value corresponding to the watermark in response to the determination and when the end of run mode uses a conventional codeword from the codespace.

39. The computer program product of claim 38 wherein the instructions that indicate the first binary value further comprise instructions that:

transmit an incremented run length value to restore the shortened run length to an unshortened run length of repeated data values.

40. The computer program product of claim 38 wherein a keying sequence of binary values is used to determine when an end of run mode includes a bit value from the watermark.

41. The computer program product of claim 38 wherein the compressed data stream is implemented using a JPEG-LS compatible compression operation.

* * * * *

UNITED STATES PATENT AND TRADEMARK OFFICE
CERTIFICATE OF CORRECTION

PATENT NO. : 7,386,148 B2  Page 1 of 1
APPLICATION NO. : 10/903102
DATED : June 10, 2008
INVENTOR(S) : Gadiel Seroussi It is certified that error appears in the above-identified patent and that said Letters Patent is hereby corrected as shown below:

In column 6, line 6, delete "or" and insert -- of --, therefor.

In column 6, line 13, delete "or" and insert -- of --, therefor.

In column 6, line 15, delete "or" and insert -- of --, therefor.

In column 18, line 42, in Claim 23, delete "or" and insert -- of --, therefor.

Signed and Sealed this

Thirteenth Day of January, 2009

JON W. DUDAS
*Director of the United States Patent and Trademark Office*